(12) United States Patent
DiChiara, Jr.

(10) Patent No.: US 6,852,271 B1
(45) Date of Patent: Feb. 8, 2005

(54) FLEXIBLE INSULATION BLANKET HAVING SECONDARILY BONDED CERAMIC MATRIX COMPOSITE LAYER

(75) Inventor: Robert A. DiChiara, Jr., Carlsbad, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/638,725

(22) Filed: Aug. 11, 2003

Related U.S. Application Data

(62) Division of application No. 10/291,940, filed on Nov. 11, 2002.

(51) Int. Cl.[7] .............................. B28B 3/00; B32B 31/20
(52) U.S. Cl. ....................... 264/642; 264/641; 264/643; 264/666; 264/312; 264/324; 264/241; 264/257; 264/258; 156/89.11; 156/245; 156/285; 156/286; 442/178; 442/247; 442/302; 501/53; 501/133; 428/689; 428/446
(58) Field of Search ................................. 264/641, 642, 264/643, 666, 313, 324, 241, 257, 258; 156/89.11, 245, 285–286; 442/178, 247, 302; 501/133, 53; 428/689, 446

(56) References Cited

U.S. PATENT DOCUMENTS

| | | |
|---|---|---|
| 5,024,978 A | 6/1991 | Allaire et al. |
| 5,038,693 A | 8/1991 | Kourtides et al. |
| 5,080,306 A | 1/1992 | Porter et al. |
| 5,277,959 A | 1/1994 | Kourtides et al. |
| 5,296,288 A | 3/1994 | Kourtides et al. |
| 5,451,448 A | 9/1995 | Sawko et al. |
| 5,514,474 A | 5/1996 | Morgan et al. |
| 5,626,951 A | 5/1997 | Hogenson |
| 5,759,632 A | 6/1998 | Boakye et al. |
| 5,804,306 A | 9/1998 | Sorenson et al. |
| 5,811,168 A | 9/1998 | Rasky et al. |
| 5,928,752 A | 7/1999 | Newquist |
| 5,990,025 A | 11/1999 | Suyama et al. |
| 6,007,026 A | 12/1999 | Shorey |
| 6,418,973 B1 | 7/2002 | Cox et al. |
| 6,479,104 B1 | 11/2002 | DiChiara, Jr. et al. |
| 6,497,390 B1 | 12/2002 | Fischer et al. |
| 6,617,013 B2 | 9/2003 | Morrison et al. |
| 6,652,950 B2 | 11/2003 | Barney et al. |
| 2002/0189496 A1 | 12/2002 | Davis et al. |

OTHER PUBLICATIONS

Aerospace Engineering; Thermal Protection For Spacecraft (Magazine); Oct., 1999; pp. 27–29; An SAE Aerospace Publication.

"3M Nextel textiles–Ceramic fiber products for outerspace applications", Ceramic Materials Department, Nov. 1996, pp. 1–5.

"Ceramic textiles and composites –Product bulletin", Ceramic textiles and composites, 3M, 1996, pp. 1–2.

Primary Examiner—Deborah Jones
Assistant Examiner—Ling Xu
(74) Attorney, Agent, or Firm—Alston & Bird LLP

(57) ABSTRACT

A flexible insulation blanket having a smoothly surfaced, secondarily bonded, ceramic matrix composite (CMC) outer layer, and a method of producing a flexible insulation blanket having a secondarily bonded CMC layer by forming a CMC prepreg layer comprising a woven ceramic fabric layer impregnated with a pre-ceramic slurry and layering the prepreg layer with a flexible insulation blanket. The blanket and prepreg layer are then compressed such that the prepreg layer abuts a rigid smoothly surfaced plate and the ceramic material is cured by heating while under compression. Pressure is then released and the insulation is fired to sinter the ceramic material of the CMC layer.

13 Claims, 3 Drawing Sheets

FLEXIBLE INSULATION BLANKET HAVING SECONDARILY BONDED CERAMIC MATRIX COMPOSITE LAYER

CROSS-REFERENCE TO RELATED APPLICATION

This application is a divisional of U.S. application Ser. No. 10/291,940, filed Nov. 11, 2002, which is hereby incorporated herein in its entirety by reference.

FIELD OF THE INVENTION

The invention relates to flexible reusable surface insulation blankets for use on the outer surface of reusable launch vehicles. More particularly, the invention relates to ceramic coatings and methods of coating the outer mold line surface of insulation blankets.

BACKGROUND OF THE INVENTION

Reusable launch vehicles (RLV's) such as the Space Shuttle Orbiter utilize reusable thermal protection systems (TPS's) for thermal protection during launch, orbit, and reentry into the atmosphere. The TPS must simultaneously perform as a radiator, a reflector, and an insulator in order to, respectively, emit heat from the surface of the vehicle, prevent on-orbit heating, and protect the structure of the vehicle from residual heat flux.

During a typical reentry, the outer surface of the Orbiter is subjected to heating in excess of 2300° F. The underlying structure of the Orbiter is primarily aluminum and graphite epoxy, and the TPS must protect the structure from any temperatures exceeding 350° F. Therefore, insulation used with the TPS must have extraordinarily low thermal conductivity while being able to withstand the physical rigors of space flight.

Most thermal insulation consists of reusable surface insulation tiles. The tile substrate materials and coating selections are dependent upon the mechanical and thermal requirements of the particular location on the vehicle. For example, tiles located on the upper surface of the forward fuselage experience much lower temperatures and require less strength then tiles on the nose of the vehicle. The tiles are typically low-density blocks of rigid ceramic fibers such as alumina or silica fibers and have a typical width and length of 6 inches by 6 inches.

Recently, it has become commonplace to use flexible blanket insulation, often called flexible insulation (FI), in place of ceramic tiles as a part of the TPS of RLV's. The flexible insulation is basically a layer of pliable alumina or other ceramic batting sandwiched between layers of ceramic fabric. The fabric layers and batting are sewn together with a ceramic thread to form a quilted insulation blanket. The outer portion of the blanket is coated with a ceramic slurry, which dries and forms a ceramic coating on the top fabric portion of the blanket. The typical ceramic matrix is known as a C-9™ coating, which consists of Ludox™ silica sol, available from W. R. Grace & Co., Columbia, Md., and a silicon carbide high emissivity agent. A blanket treated in such a manner can withstand multiuse temperatures of 1200° F. with a onetime use temperature of 1400° F. under static conditions.

The flexible insulation is favorable for use on RLV's because it is much easier to maintain and replace than individual insulation tiles. Large unitary pieces of flexible insulation blanket may be constructed to conform to the contours of a vehicle, which would have previously required hundreds of individually installed tiles for insulation. The flexible insulation is also able to withstand undulations and vibrations of the underlying vehicle better than the ceramic tiles, which are rigid and brittle and must be carefully spaced along an undulating vehicle surface to prevent the tiles from fracturing. Another advantage of blankets is that tile systems weigh more then blanket systems and must also have a strain isolation pad (SIP) along with insulation filler bars between tiles.

There are some drawbacks associated with the use of traditional flexible blankets. The flexible blankets have a somewhat rough, quilted upper fabric layer. The C-9™ coating used to coat most blankets is made of coarse SiC particles in a liquid silica sol medium. These coarse SiC particles do not penetrate into the fibers of the outer blanket cloth and therefore are captured on the surface of the coarse fibers. To be compatible with the C-9™ coating, the upper layer of fabric must use a coarse fabric weave. Further, because the outer layer of fabric and the batting are loosely quilted together, the outer layer of fabric does not provide a uniform substrate for forming a flat, smooth surface. For instance, during drying of the C-9™ coating, the upper fabric layer tends to buckle and to cure as a slightly irregular surface. Once cured, the coarse C-9™ coatings sometimes have a tendency to flake off of the blanket during use.

The rough and irregular surfaces of flexible insulation blankets have heretofore made them unsuitable for use on windward surfaces of vehicles or surfaces of vehicles which experience relatively high temperatures, such as the nose section and leading edges of the vehicle. When in use, the irregular surface of the blankets causes early tripping of the boundary layer as well as increased friction along the surface of the vehicle upon reentry, thereby generating large amounts of excessive heat. Therefore, flexible insulation blankets have only been used upon leeward surfaces of the RLV's which do not experience aero turbulence or high temperatures during reentry.

What is needed is a flexible insulation blanket having a smooth, uniform, durable, light weight, and thin protective ceramic layer and a method of producing such a blanket. Further, what is needed is a method of producing a flexible insulation blanket having a uniform ceramic layer without imparting unfavorable weight or insulative characteristics to the blanket.

SUMMARY OF THE INVENTION

The invention is a method of producing ceramic insulation by secondarily bonding a ceramic matrix composite (CMC) layer to a flexible insulation blanket wherein the CMC layer provides the blanket with a smooth, aerodynamically suitable, outer surface. The insulation is produced by first forming a CMC pre-impregnation ("prepreg") layer by impregnating a woven ceramic fabric layer with a pre-ceramic slurry. The prepreg is then layered onto the outer surface of a flexible insulation blanket. The exposed surface of the prepreg is pressed against a smoothly surfaced rigid plate so that the prepreg is shaped into an article having a smooth surface quality, with no unwanted ridges, bubbles, indentations, or the like. While the prepreg layer is maintained against the rigid plate, the prepreg layer and the blanket are compressed and the ceramic material is cured by heating. After the ceramic material has cured, pressure upon the blanket and prepreg layer is released.

Because the ceramic material of the insulation is cured while the prepreg layer is held under pressure, against the smoothly surfaced plate, the prepreg does not buckle or bubble during curing of the ceramic material. The pre-ceramic material within the prepreg cures to form a ceramic matrix composite with the ceramic fabric layer. Pressure is then released and the resulting insulation is fired at high temperature to sinter the ceramic material.

While under pressure, an amount of pre-ceramic material from the prepreg layer protrudes into the outer surface of the insulation blanket. During the curing step, the CMC layer becomes bound to the flexible insulation blanket via the ceramic material which cures between the CMC layer and the outer surface of the insulation blanket. After being cured and sintered, the resulting insulation has a flat, smooth, and flexible CMC layer integrally bonded to a flexible quilted insulation blanket.

BRIEF DESCRIPTION OF THE DRAWINGS

Figure 1:
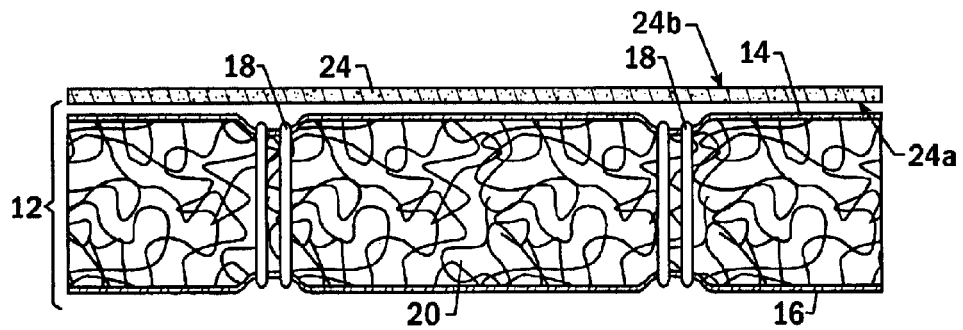
Figure 2:
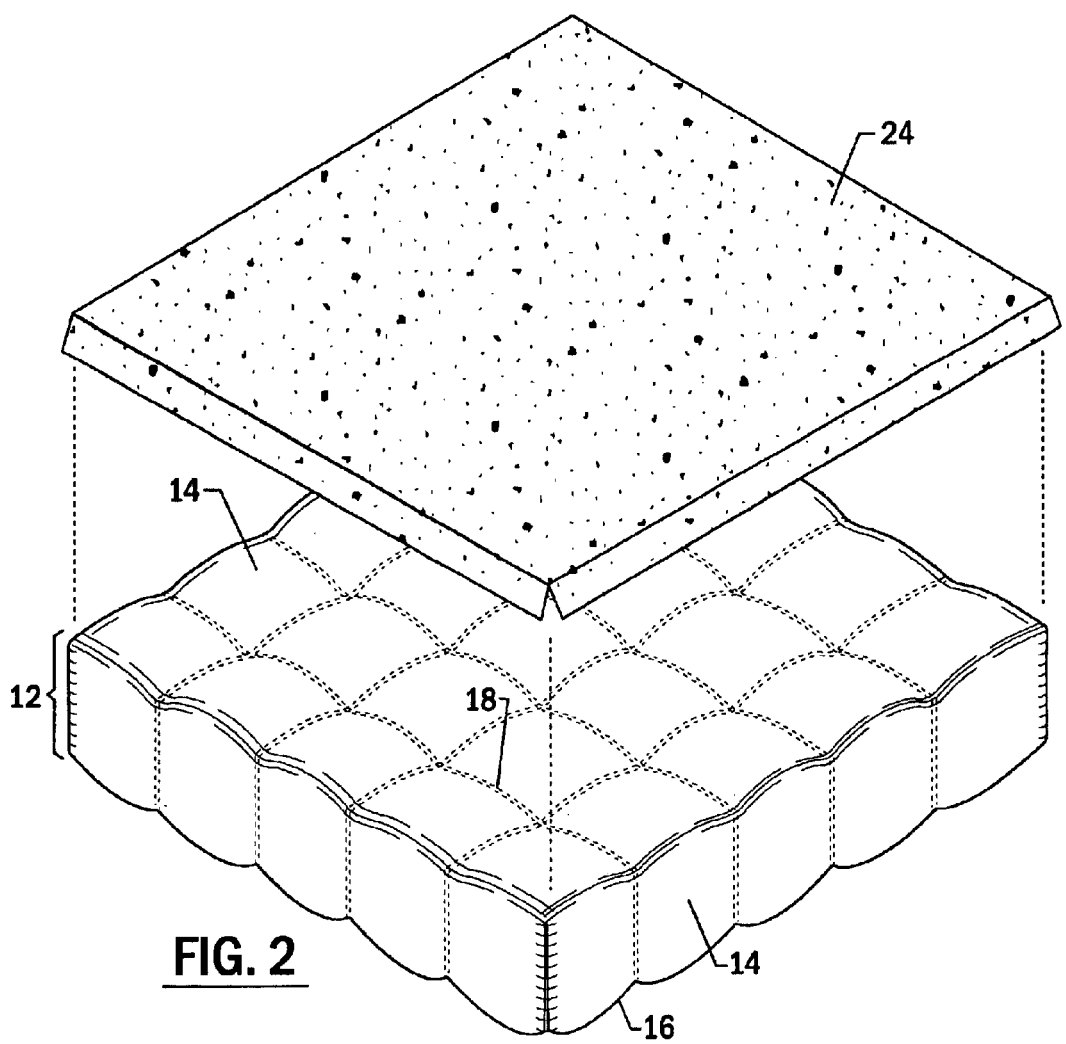
Figure 3:
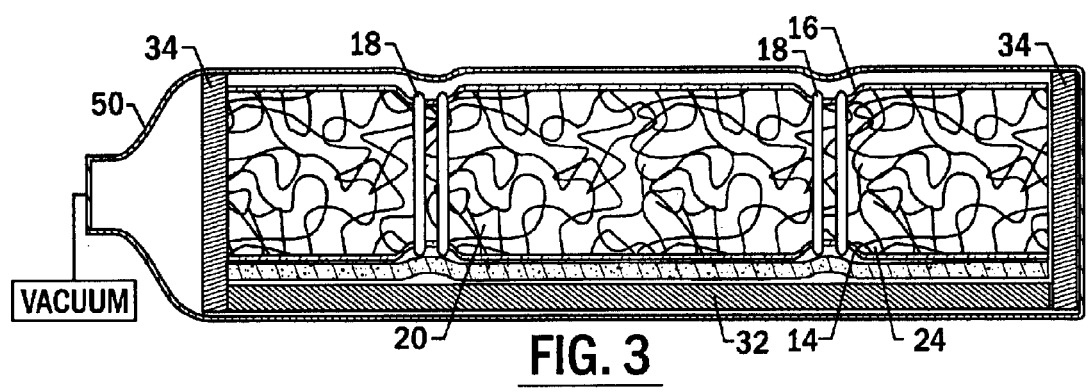
Figure 4:
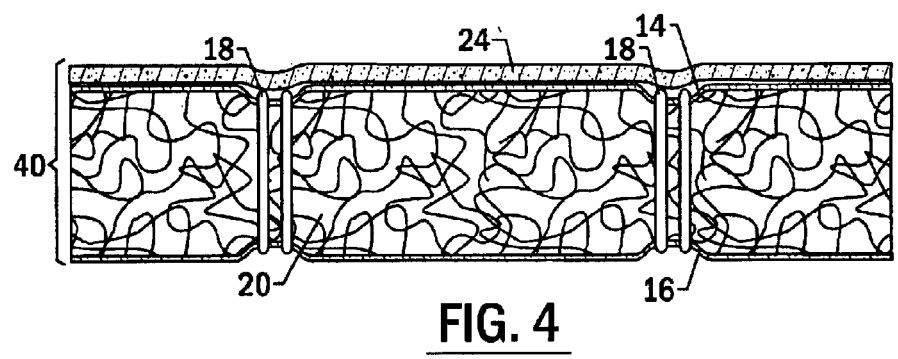
Figure 5:
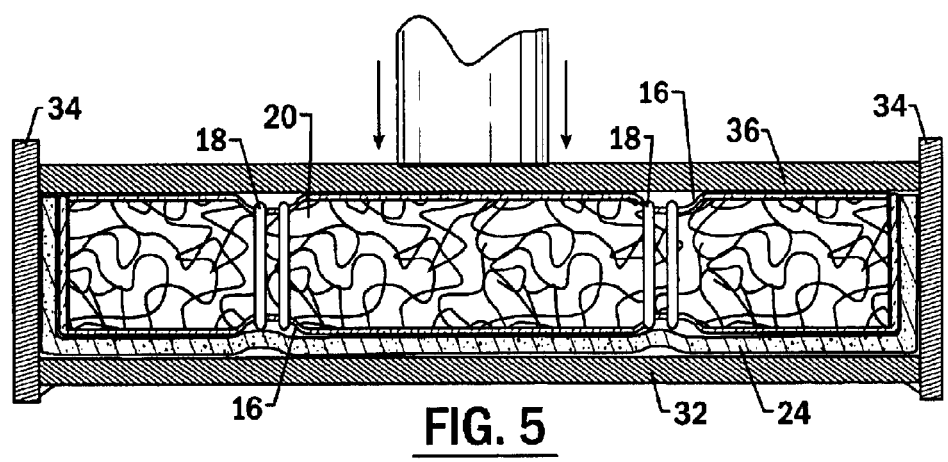
Figure 6:
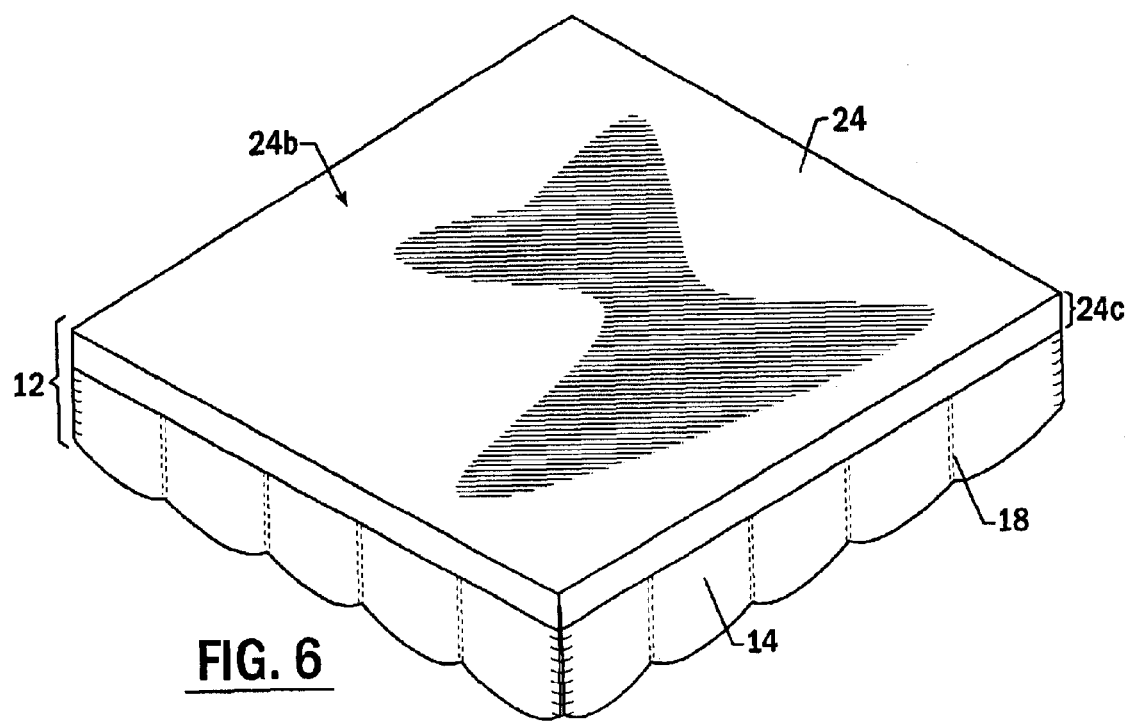

Having thus described the invention in general terms, reference will now be made to the accompanying drawings, which are not necessarily drawn to scale, and wherein:

FIG. 1 is a cross-sectional view of the unassembled components of an embodiment of the invention;

FIG. 2 is a perspective view of a flexible insulation blanket shown with an additional ceramic fabric layer;

FIG. 3 is a cross-sectional view of a CMC-layered flexible insulation blanket being compressed in accordance with an exemplary process of this invention;

FIG. 4 is a cross-sectional view of an embodiment of the invented CMC-layered flexible insulation blanket;

FIG. 5 is a cross-sectional view of an embodiment of the invented CMC-layered flexible insulation blanket within a frame; and FIG. 6 is a perspective view of a flexible insulation blanket with an CMC layer secondarily bonded thereto in accordance with an embodiment of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, the invented method first entails the construction or acquisition of a flexible insulation blanket 12. It is anticipated that the invented insulation will be most often used to insulate the outer surface of a spacecraft such as the Space Shuttle though the insulation is not limited to such use. For purposes of this description, "outer" or "Outer Mold Line (OML)" components are those components which are disposed at a greater distance from the spacecraft than are corresponding "inner" or "Inner Mold Line (IML)" components of the insulation. Likewise, "outer" surfaces of components tend to face outwardly away from the vehicle while "inner" surfaces face the vehicle.

The flexible insulation blanket comprises an outer fabric layer 14 woven of heat resistant ceramic fiber, an inner fabric layer 16 woven of a heat resistant ceramic fiber which may or may not be the same fiber as the outer layer 14, and a layer of batting material 20 placed between the two fabric layers 14,16. The outer layer 14, batting 20, and inner layer 16 are loosely sewn together with a heat resistant ceramic thread 18 to form a quilted blanket 12.

An exemplary embodiment of a flexible blanket 12 which may be used with this invention is Advanced Flexible Reusable Surface Insulation (AFRSI). AFRSI is comprised of quartz fiber batting 20 that is sandwiched between high temperature woven quartz fiber outer fabric layer 14 and a lower temperature glass inner layer 16. The components are stitched together using quartz and glass threads 18 in one inch square patterns. The outer fabric layer 14 may be folded down over the edges of the blanket and secured in place by stitching 19. The platform size of such blankets 12 is up to 36 inches by 36 inches, and the thickness is from 0.2 inches to slightly less than 3 inches. Such blankets have been used on portions of the upper surface of the Space Shuttle, and is commercially available from Boeing, High-Temp Inc. and Oceaneering Thermal Systems, Seattle, Wash.

A second exemplary embodiment of a flexible blanket 12 which may be used with this invention is comprised of alumina fiber batting 20 that is sandwiched between a high temperature woven Nextel™ fiber outer fabric layer 14 and a Nextel™ fiber inner fabric layer 16. Alternatively, the inner fabric layer 16 may be s-glass, e-glass, or similar ceramic fiber material capable of being woven into a fabric. The components are stitched together using Nextel™ threads 18 in one inch square patterns. The outer fabric layer 14 may be folded down over the edges of the blanket and secured in place by stitching 19. Similar to the AFRSI, the size of such blankets 12 is up to 36 inches by 36 inches, and the thickness is from 0.2 inches to slightly less than 3 inches.

Referring again to FIG. 1, a third fabric layer 24 is constructed of woven ceramic fibers. The layer 24 preferably has a thickness of between about 0.01 and about 0.06 inches, and most preferably about 0.03 inches. The fibers of the fabric are ceramic and remain physically stable when exposed to extreme temperatures, such as those experienced by a spacecraft upon re-entry into the atmosphere. The fibers are continuous, meaning that most of the fibers span a substantial portion of either the length or width of the woven fabric. Exemplary fabrics are quartz woven fabrics, Nextel™ fabrics, mullite fabrics, and silicon carbide farics. Of the Nextel™ fabrics, Nextel™ 610 (alumina), Nextel™ 720 (mullite), Nextel™ 312 and Nextel™ 440 (aluminoborosilicate) fabrics are preferred, with Nextel™ 440 being particularly preferred due to its lower cost. The 3-ply angle interlock is the preferred weave due to its durability, though other weaves such as #500 Satin, #800 satin, and plain weaves can be used.

A pre-ceramic slurry is formed by placing ceramic particles in a suspending agent. An exemplary pre-ceramic slurry is the suspension of alumina silicate colloidal particles in a suspending agent of alcohol or acetone. Other exemplary precursors include alumina, silica, mullite, cordierite, silicon carbide, silicon nitride, and black glass. A pre-ceramic aluminum silicate slurry is preferably formed from an alcohol or acetone based aluminum silicate suspension. Beta or alpha, preferably beta, silicon carbide is optionally added to the suspension as a high emissivity agent to lower the surface temperature of the blanket when in use, by absorbing and reradiating the beat to space. The pre-ceramic slurry is a suspension of 50–85 wt % solids, preferably about 68 wt %, in alcohol or acetone preferably alcohol. The solids are composed of 60–100 wt %, preferably about 90 wt %, aluminum silicate particulates, and 0–40 wt %, preferably about 10 wt %, SiC particulates. Other emissivity agents can readily be substituted for SiC in the formulation. A method such as ball milling may be used to combine and mix the components of the pre-ceramic slurry.

The third layer of fabric 24 is soaked with the pre-ceramic slurry in order to form a ceramic matrix composite (CMC)

prepreg. The fabric 24 may be soaked with the slurry in any number of ways, including but not limited to simply immersing the fabric within the slurry, pulling the slurry through the fabric with a vacuum, and, preferably, applying the slurry to the fabric with a doctor blade. It is within the scope of this invention that multiple plies of fabric 24 are used in place of the single third layer specified above. If multiple plies of fabric are used, then the pre-ceramic slurry is soaked through each of the layers.

After the pre-ceramic slurry is well infiltrated into the third fabric layer 24 to form the prepreg, at least a portion of the solvent of the slurry is allowed to evaporate. As the solvent evaporates, the pre-ceramic slurry within and on the fabric layer 24 becomes tacky. After a period of 12 to 24 hours, depending upon the solvent composition used, the pre-ceramic slurry becomes a pre-ceramic paste that has infiltrated throughout the fabric material of the prepreg 24. The pre-ceramic paste on the surfaces of the fabric make each of the prepreg surfaces 24a, 24b very tacky.

After the pre-ceramic material within the prepreg 24 is allowed to become tacky, the prepreg layer 24 is positioned on top of the outer fabric layer 14 of the blanket 12 such that inner surface 24a of the prepreg 24 is in intimate contact with the outer layer 14 of the blanket 12. The prepreg 24 remains temporarily adhered to the blanket 12 due to the tackiness of the pre-ceramic paste material.

Referring to FIG. 2, the prepreg 24 may simply be sized and positioned to cover the outer layer 14 of the blanket 12 or the prepreg 24 layer may have edges which overlap the ends of the underlying blanket 12 and fold downward toward the inner layer 16 of the blanket such that the edges of the prepreg 24 cover part of or all of each side portion of the blanket 12. The corners formed by the overlapped prepreg 14 layer may be stitched with ceramic thread in order to hold the edges of the prepreg 14 folded down over the sides of the blanket 12. It is preferable that the edges of the prepreg 24 overlap at least a portion of each side of the blanket 12, so that the resulting insulation will have smooth side surfaces, allowing a number of the invented pieces of insulation to be positioned closely beside one another on the spacecraft.

The outer surface 24b of the prepreg layer 24 that faces away from the outer fabric layer 14 is also very tacky due to the infiltration of the thickened pre-ceramic paste within the fabric layer. A release agent is applied to the outer surface 24b of the prepreg so that a flat plate may be contacted with the outer surface 24b without adhering to the prepreg layer 24. For instance, a release agent film such as Teflon or Armalon, preferably Teflon, may be used.

Referring to FIG. 3, the outer surface 24b of the prepreg layer is coated with a releasing agent, and the blanket 12 and prepreg layer 24 are compressed and held under compression such that the outer surface 24b is held flush against a smooth surfaced, rigid plate. The compression of the blanket 12 and prepreg 24 against the smooth surface causes the prepreg layer 24 to be maintained in a relatively flat, planar orientation. The pressure of the compression also drives a small portion of the thickened pre-ceramic paste from the prepreg layer 24 into the outer layer 14 of the blanket 12.

An exemplary compression method is to place the blanket and plate 32 in a vacuum bag 50 and applying a vacuum of about 10–12 inches of Mercury. The compression of the blanket 12 against the smooth surface causes the outer layer 14 and prepreg layer 24 to be maintained flush against the smoothly surfaced plate 32.

In an alternative embodiment of the invention, as shown in FIG. 5, the prepreg 24 and blanket 12 are placed in a frame. The tile frame has a flat plate surface 32 and side walls 34 which contain the prepreg 24 and blanket 12 within the confines of the frame. The flat surface 32 of the frame supports the prepreg layer 24 and holds the prepreg layer 24 in a smooth, planar orientation. Pressure is applied to the inner surface 16 of the blanket by a movable plate 36. The plate 36 compresses the blanket 12 in the thickness direction and maintains the blanket and prepreg 24 under pressure. Typical pressures for mechanical compression are about 5 to 10 psi.

While the blanket 12 and prepreg 24 are maintained under pressure, the temperature of the blanket/prepreg assembly is raised to the curing temperature of the pre-ceramic paste. The curing temperature for the pre-ceramic materials used herein vary. By way of example, the curing temperature for the preferred aluminum silicate pre-ceramic is from about 100° F. to about 350° F., and a favorable curing sequence for aluminum silicate slurries is about 180° F. for 2 hours, then 250° F. for 1 hour, and then 350° F. for 1 hour, all with ramp up temperatures of about 18° F. per minute. Curing of the ceramic material causes the ceramic within the prepreg 24 to solidify and converts the prepreg 24 into a ceramic matrix composite (CMC) layer 24 comprising a layer of ceramic fabric embedded within a matrix of ceramic material. Also, curing the ceramic matrix causes the blanket 12 to bond to the CMC layer 24 via the cured ceramic material transferred from the prepreg 24 to the outer layer 14 of the blanket 12 during the compression stage of the process. Together, the CMC layer 24 and the blanket 12 form a secondarily bonded CMC flexible insulation material 40, as shown in FIG. 4.

By supporting the prepreg layer 24 upon a smooth surface during the curing of the prepreg 24, a resultant CMC secondarily bonded flexible insulation blanket having a smooth CMC layer may be achieved. Both the blanket layer 12 and the CMC layer 24 are flexible after curing, so the CMC bonded insulation laminate 40 may later be shaped to fit the curvature of a particular area of a vehicle. Alternatively, the prepreg 24 and blanket 12 may be compressed against a non-flat plate such as a curved plate or specially shaped plate as long as the plate in contact with the prepreg layer 24 has a smooth surface and the plates provide relatively even compression over the surface area of the blanket 12 and the prepreg 24 layer.

After curing of the ceramic material, the insulation 40 is removed from the applicable compression apparatus and allowed to decompress. The CMC layer 24, which was cured while pressed against a smooth surface, retains its smooth orientation after it is allowed to decompress. The batting 20 within the blanket portion 12 of the insulation 40 expands and returns to its original dimensions as before compression took place.

Referring to FIG. 6, after curing and removal from compression, the blanket 12 has an upper surface that is securely secondarily bonded to a layer of CMC 24. As mentioned, the edges of the CMC layer 24 are preferably folded downward 24c upon the blanket so that the sides of the blanket are covered with the CMC layer 24 near the outer portion of the blanket.

Finally, the insulation 40 is subjected to a sintering heat treatment. Alumina silicate CMC is set up and sintered at a temperature of between about 400° F. to about 1200° F. from about 1 hour to 5 hours, preferably at 1000° F. for 2 hours. The final heating step serves the dual purposes of driving out any remaining organics within the CMC material and to fuse the ceramic fibers to the matrix material in the CMC.

The resulting flexible insulation 40 has a pliable CMC layer 24 secondarily bonded to a high temperature flexible insulation blanket 12. Because of the manner in which the CMC layer 24 is produced and bonded to the blanket 12, the CMC layer 24 has a very smooth surface quality. The smooth surface quality of the CMC layer allows the invented insulation to be used on regions of spacecraft that were previously limited to rigid ceramic tile installations. The smooth surface reduces heat caused by friction and air resistance, thus allowing the invented insulation to be used on higher temperature portions of the spacecraft, such as windward surfaces, which have previously been insulated with ceramic tiles.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of producing a smooth ceramic surface upon a quilted flexible insulation blanket comprising the steps of:
   impregnating at least one layer of woven ceramic fabric with a pre-ceramic material, said ceramic fabric having opposed inner and outer surfaces;
   layering said impregnated ceramic fabric upon a quilted flexible insulation blanket, wherein said blanket has opposed inner and outer surfaces which define a thickness of the blanket and wherein the fabric is layered upon the blanket such that the inner surface of said fabric is in intimate contact with the outer surface of said blanket;
   compressing the fabric layer and the blanket in the direction of thickness of the blanket by applying pressure to said outer surface of said fabric layer with a smoothly surfaced plate; and
   curing said pre-ceramic material while maintaining compression of said blanket to form a ceramic matrix within the fabric layer and the outer surface of the blanket.

2. The method of claim 1, wherein the pre-ceramic material is a pre-ceramic slurry and the at least one layer of fabric is impregnated with the pre-ceramic slurry by soaking the fabric within the slurry.

3. The method of claim 1, wherein the pre-ceramic material is a pre-ceramic slurry and the at least one layer of fabric is impregnated with the pre-ceramic slurry by applying a vacuum to the fabric and suctioning the slurry into the fabric.

4. The method of claim 1, wherein the pre-ceramic material is a pre-ceramic slurry and the at least one layer of fabric is impregnated with the pre-ceramic slurry by applying the slurry with a doctor blade.

5. The method of claim 1, wherein the pre-ceramic material is aluminum silicate.

6. The method of claim 1, further comprising the step of applying a releasing agent to the outer surface of the impregnated fabric layer prior to compressing the fabric layer and blanket.

7. The method of claim 1, wherein the step of curing the pre-ceramic material occurs between about 100° F. and about 350° F.

8. The method of claim 7, wherein the step of curing occurs at about 350° F.

9. The method of claim 1, further comprising the step of releasing said pressure after curing the pre-ceramic material.

10. The method of claim 9, further comprising the step of sintering said ceramic material after releasing said pressure.

11. The method of claim 10, wherein the step of sintering the ceramic matrix occurs at between about 400° F. and about 1200° F. for a time period of about 1 hour to about 5 hours.

12. The method of claim 11, wherein the step of sintering occurs for about 2 hours at a temperature of 1000° F.

13. The method of claim 1, further comprising the step of turning the edges of the fabric layer toward the inner surface of the blanket such that the edges of the fabric layer cover at least a portion of the edge of the blanket.

* * * * *